(12) United States Patent
Andry

(10) Patent No.: US 6,295,375 B1
(45) Date of Patent: Sep. 25, 2001

(54) METHOD AND DEVICE FOR CODING A SEQUENCE OF PICTURES

(75) Inventor: Laurence Andry, Yerres (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/253,084

(22) Filed: Feb. 19, 1999

(30) Foreign Application Priority Data

Feb. 20, 1998 (EP) .................................................. 98400420
Oct. 27, 1998 (EP) .................................................. 98402670

(51) Int. Cl.[7] .................................................. G06K 9/36
(52) U.S. Cl. .................................................. 382/232
(58) Field of Search ............................. 382/232, 236, 382/238, 240, 239, 234, 235, 242, 248, 250; 358/432, 433; 348/384, 394, 395, 400–404, 407–416, 420, 421, 425, 430, 431, 699

(56) References Cited

U.S. PATENT DOCUMENTS

| | | | |
|---|---|---|---|
| 5,136,376 | * 8/1992 | Yagasaki et al. | 358/433 |
| 5,321,440 | * 6/1994 | Yanagihara et al. | 348/408 |
| 5,369,439 | * 11/1994 | Matsuda et al. | 348/405 |
| 5,621,465 | * 4/1997 | Kondo | 348/395 |
| 5,684,714 | * 11/1997 | Yogeshwar et al. | 364/514 R |
| 6,038,256 | * 3/2000 | Linzer et al. | 375/240 |
| 6,094,457 | * 7/2000 | Linzer et al. | 375/240 |
| 6,192,083 | * 2/2001 | Linzer et al. | 375/240.29 |

FOREIGN PATENT DOCUMENTS

| | | |
|---|---|---|
| 0535963A2 | 4/1993 | (EP) . |
| 9318611A1 | 9/1993 | (WO) . |

OTHER PUBLICATIONS

Research and Development Report "MPEG Video Coding: A Basic Tutorial Introduction", by S.R. Ely, BBC Report RD 1996/3.

* cited by examiner

*Primary Examiner*—Jose L. Couso
(74) *Attorney, Agent, or Firm*—Russell Gross

(57) ABSTRACT

The invention relates to the use of a human visual system (HVS) in a video encoder. A coding method and device are proposed in which the allocation of bits are efficiently modified over each current picture according to the fact that the eye is more or less sensitive to each area of said picture. In view of said re-allocation, a specific computation of so-called perceptual coefficients is proposed and leads to an improved visual quality, while ensuring that the global rate control performance of the encoder is not modified.

2 Claims, 1 Drawing Sheet

METHOD AND DEVICE FOR CODING A SEQUENCE OF PICTURES

FIELD OF THE INVENTION

The present invention relates to a method of coding a sequence of pictures comprising at least the steps of:
subdividing each input picture into sub-pictures;
quantizing said signals with a variable quantizing scale;
encoding said quantized signals; and to a coding device for carrying out said method. This invention may be used particularly for the implementation of MPEG-2 encoders.

BACKGROUND ART

The main principle of image compression techniques is to remove spatial and temporal data redundancy. To this end the MPEG standard, for instance, is based on the two following techniques: discrete cosine transform (DCT) and motion compensation (as described for example in the following document "MPEG video coding: a basic tutorial introduction", S. R. Ely, BBC Report RD 1996/3).

A conventional MPEG-2 encoder mainly comprises, as indicated in FIG. 1, a formatting circuit 11, receiving each digitized picture of the concerned video sequence and intended to subdivide a picture signal—composed of a bidimensional array of picture elements, or pixels—into disjoint sub-pictures or blocks of smaller size (8×8 or 16×16 pixels), a DCT circuit 12, intended to apply to each block of pixels a bidimensional discrete cosine transform (the transform coefficients thus obtained being generally normalized to a predetermined range), a quantization circuit 13 intended to compress by thresholding and quantization (with a variable quantizer scale) the bidimensional array of the transform coefficients thus obtained for each block of pixels, a variable length encoding circuit 14, and a motion-compensated prediction circuit 15. Said prediction circuit finds for each block a motion vector matching this block to another one in the previous picture of the sequence, displaces said previous block according to the motion vector, and subtracts (the subtracter is here assumed to be included into the prediction circuit 15) the predicted picture thus obtained from the current one for delivering the difference picture that will be transformed, quantized and coded. Moreover, a picture type defines which prediction mode, I, P, or B, will be used to code each macroblock: I type corresponds to I-pictures coded without reference to other pictures, P type to P-pictures coded using motion-compensated prediction from a past I- or P-picture, and B type to B-pictures using both past and future I- or P-pictures for motion compensation. A buffer 16 allows to store the output coded signals and to smooth out the variations in the output bit rate, and a rate control and quantizer scale variation circuit 17, provided between said buffer and the quantization circuit 13, allows to adjust the variable quantizer scale.

However, in most image processing systems, the final observer of the perceived images is the human eye. Image coding schemes incorporating the human visual system (called HVS in the following part of the description) may be proposed, in which the HVS model is adapted to a coding scheme based on the MPEG-2 standard, in order to obtain more pleasant images. An HVS model, whatever its complexity, must represent the visual processings performed by the human eye and has therefore to determine whether an image area is visually sensitive or not.

Many proposed HVS models rely on two key concepts: the contrast, and the masking, these two processings being performed sequentially by the HVS. It is known, indeed, that the human eye is sensitive to the luminance contrast across an image. Processings performed by the visual cortex do not apply to the absolute light level but to the contrast, defined as the ratio of the local intensity information over the average image intensity. One of the simplest definitions of the contrast C is given by the Weber's law:

$$C = \frac{\Delta L}{LB} \quad (1)$$

where L is the luminance difference to the background and LB is the background luminance. In case of more complex pictures, another contrast definition may be given: it is then defined as the ratio of a band-limited version of the picture—which is decomposed by the HVS into a set of sub-pictures expressed in several frequency bands and various orientations—over the mean luminance contained in the lower remaining frequency bands (when such a multi-resolution HVS model is thus considered, the contrast assessment requires two steps, a first one for decomposing the picture into a set of sub-pictures at various scales and orientations, with a pyramidal decomposition such as the Simoncelli pyramid, and a second one for computing the contrast for each scale and each orientation). The masking effect is then taken into account through a masking function which is applied to the obtained contrast information; this effect corresponds to the variation of a stimulus visibility threshold as a function of the luminance present in the neighbourhood of this stimulus. In other words, there is masking when a signal (the stimulus) cannot be seen because of the presence of another signal with similar characteristics but at a higher level (here, the background luminance around this stimulus).

Computations based on these two concepts (contrast, masking) finally allow to obtain perceptual measures for each pyramid band. Assuming that the relation between the DCT domain and the pyramidal frequency domain is linear, perceptual weighting factors (PWF) for each DCT basis function of each block are derived (by computation) from the perceptual measures obtained for each frequency and orientation band. This information may be exploited to allocate more bits to encode most visually sensitive areas and less bits to encode other areas of the same picture. An encoder of this type is described for instance in the European patent application EP 0535963. In said encoder, a quantization control circuit generates for each block a quantization control signal that detects a degree of influence on visual sensation for each block and then allows to specify an appropriate quantization step size received by a quantization circuit.

SUMMARY OF THE INVENTION

The object of the invention is to improve the visual quality obtained by means of such an adaptive quantization.

To this end the invention relates to a coding method such as defined in the preamble of the description, said method being further characterized in that it also comprises, before said quantizing step, the additional sub-steps of:
generating from each input picture a set of visual sensitivity values S(i) respectively associated to sub-pictures i of said input picture;
computing from said set of values perceptual coefficients W(i), one per sub-picture, said computation being based on the cumulative distribution function F(S(i)) associated to said values S(i) and according to the following expression:

$$W(i)=(1+a/2)-(a.F(S(i)))$$

where a is a constant provided for controlling the modulation amplitude.

The invention also relates, for carrying out said method, to a device for coding a sequence of pictures comprising at least formatting means for subdividing each input picture into sub-pictures, quantization means, provided for compressing by thresholding and quantization a digital bitstream corresponding to said pictures, encoding means, provided for coding the output signals of said quantizing means, and rate control and quantizer scale variation means, provided for ensuring a constant bit rate at the output of said coding device, characterized in that said device also comprises, in series between its input and said quantizing means, bit reallocation control means including:

means for generating from each input picture a set of visual sensitivity values, S(i) respectively associated to sub-pictures i of said input picture;

means for computing from said set of values perceptual coefficients W(i), one per sub-picture, said computation being based on the cumulative distribution function F(S(i)) associated to said values S(i) and according to the following expression:

$$W(i)=(1+a/2)-(a.F(S(i)))$$

where a is a constant provided for controlling the modulation amplitude.

BRIEF DESCRIPTION OF THE DRAWINGS

The particular aspects of the invention will now be explained with reference to the embodiment described hereinafter and considered in connection with the accompanying drawings, in which.

DETAILED DESCRIPTION OF THE INVENTION

It is known that, in an encoder such as described in the cited European patent application, the bit allocation is mainly dependent on the quantizer scale (one per macroblock), determined to ensure a constant bit rate at the output of the encoder: a lower (resp. higher) quantizer scale results in a better (resp.worse) image quality and a higher (resp.lower) number of coding bits. To obtain said quantizer scale, the amount of bits that can be allocated for the current macroblock to be encoded is first determined (rate controlling step). This target bit number then allows to set a reference value of the quantizer scale Q(i) for said macroblock. An adaptive quantization is finally carried out by means of a modulation of this reference value of the quantizer scale according to the spatial activity of the macroblock.

Figure 1:
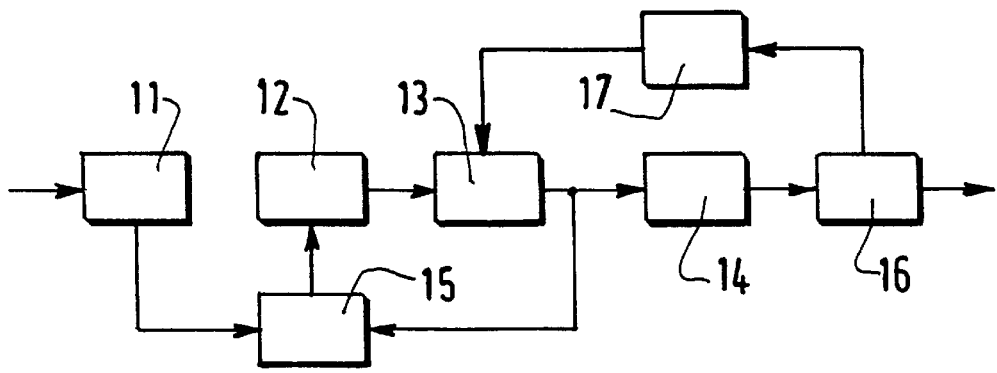
FIG. 1 depicts the main circuits of a conventional MPEG-2 encoder.
Figure 2:
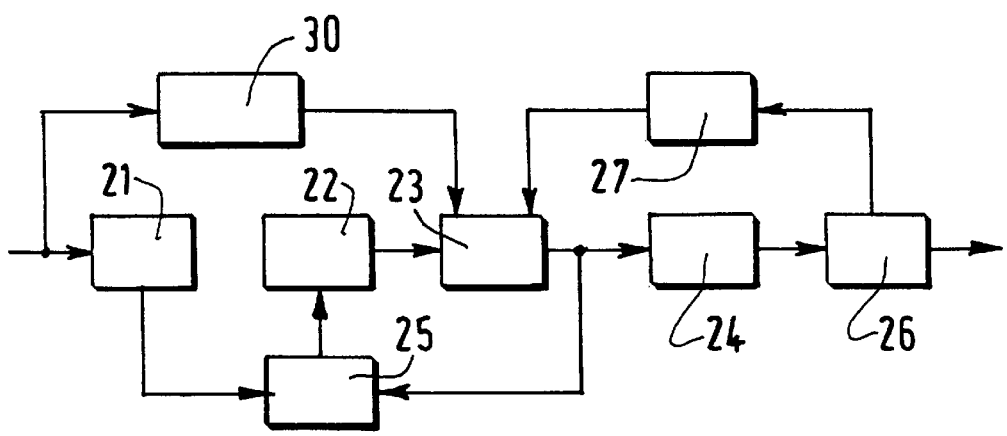
FIG. 2 illustrates an encoder according to the present invention.

Although visual image quality is already improved with such an adaptive quantization, the invention noticeably increases said quality by replacing the prior art structure by the structure of the encoder shown in FIG. 2. In said scheme, the formatting circuit, the DCT circuit, the quantization circuit, the encoding circuit, the prediction circuit, the output buffer and the rate control and quantizer scale variation circuit are now designated by the references 21 to 27 respectively. Said rate control and quantizer scale variation circuit 27 is provided as previously between the buffer 25 and the quantization circuit 23. A bit reallocation control circuit 30, detailed in FIG. 3, is provided for carrying out the principle of the present invention.

Figure 3:
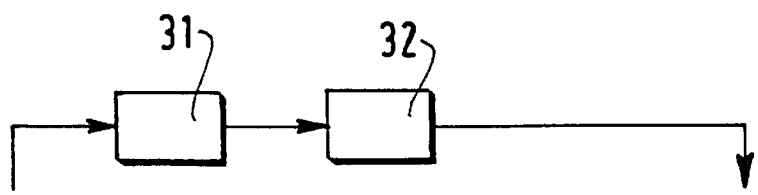
FIG. 3 shows in greater detail an essential circuit of the encoder of FIG. 2.

Referring to said FIG. 3, the circuit 30 comprises an HVS modeling circuit 31 that receives each input picture and processes it in order to decompose it into a set of pictures and to compute the contrast and the masking for each of them, which allows to generate perceptual weighting factors. A visual sensitivity value S(i) per macroblock i in the DCT domain is then computed according to the relation (2):

$$s(i) = \frac{1}{Nb}\sum_{i=1}^{i=Nb}\left[\sum_{j=1}^{j=64}(PWF)^2\right]^{1/2} \quad (2)$$

with Nb=number of blocks per macroblock=4. An appropriate processing, further described below, is then carried out in a processing circuit 32, at the output of which so-called perceptual modulation coefficients W(i), one per macroblock, are available.

It must here be recalled that a reference value of the quantizer scale Q(i) is set by the rate control and quantizer scale variation circuit 27 for the macroblock i, according to the number of bits available for this macroblock, and that the final sensitivity-based quantizer scale Q'(i) is then computed for the macroblock i according to the expression Q'(i)=Q(i).W(i). Said processing for the computation of the coefficients W(i) (in the circuit 32) is then the following. First these coefficients must be greater than 1 when the sensitivity is low, thus leading to a higher quantizer scale, and lower than 1 when the sensitivity is high. On the other hand, in order to fit the major constraint due to the complex operation carried by the circuit 27 for ensuring a constant bit rate at the output of the encoder, two figures—the number of bits T spent to encode the current picture and a global complexity measure X- are considered.

For one picture, these two figures are combined according to the following expression (3):

$$X=T.Q(av) \quad (3)$$

where Q(av) is the average quantizer scale over the picture. In order to keep the circuit 27 from being disturbed by the quantizer parameter modulation, it is advantageous not to modify the values of T and X. This result may be obtained if the quantizer scale Q(av) is also not modified by the quantizer parameter modulation i.e. if:

$$Q'(av)=Q(av) \quad (4)$$

This condition (4) induces that the average perceptual modulation coefficients W(i) must be equal to 1. To address this issue, the computation of the perceptual modulation coefficients W(i) will be based on the cumulative distribution function of the sensitivity, which can be written:

$$W(i)=(1+a/2)-(a.F(S(i))) \quad (5)$$

where F(S(i)) is the cumulative distribution function of the sensitivity and a is a constant allowing to control the modulation amplitude. For one picture, the perceptual modulation coefficients W(i) are greater than 1 for half of the macroblocks and lower than 1 for the other half. Moreover, the modulation amplitude is dependent both on the eye sensitivity and on the occurrence frequency of this sensitivity.

Thus, for each picture, bits are reallocated preferably to sensitive areas, while ensuring that the rate control performance is not modified.

What is claimed is:

1. A method of coding a sequence of pictures comprising at least the steps of:

subdividing each input picture into sub-pictures;

quantizing said signals with a variable quantizing scale;

encoding said quantized signals;

wherein said method also comprises, before said quantizing step, the additional sub-steps of:

generating from each input picture a set of visual sensitivity values S(i) respectively associated to sub-pictures i of said input picture;

computing from said set of values perceptual coefficients W(i), one per sub-picture, said computation being based on the cumulative distribution function F(S(i)) associated to said values S(i) and according to the following expression:

$$W(i)=(1+a/2)-(a.F(S(i)))$$

where a is a constant provided for controlling the modulation amplitude.

2. A device for coding a sequence of pictures comprising at least formatting means for subdividing each input picture into sub-pictures, quantization means, provided for compressing by thresholding and quantization a digital bitstream corresponding to said pictures, encoding means, provided for coding the output signals of said quantizing means, and rate control and quantizer scale variation means, provided for ensuring a constant bit rate at the output of said coding device, characterized in that said device also comprises, in series between its input and said quantizing means, bit reallocation control means including:

means for generating from each input picture a set of visual sensitivity values S(i) respectively associated to sub-pictures i of said input picture;

means for computing from said set of values perceptual coefficients W(i), one per sub-picture, said computation being based on the cumulative distribution function of the sensitivity F(S(i)) associated to said values S(i) and according to the following expression:

$$W(i)=(1+a/2)-(a.F(S(i)))$$

where a is a constant provided for controlling the modulation amplitude.

* * * * *